US010776012B2

(12) United States Patent
Enz et al.

(10) Patent No.: US 10,776,012 B2
(45) Date of Patent: Sep. 15, 2020

(54) LOCK-FREE DATAPATH DESIGN FOR EFFICIENT PARALLEL PROCESSING STORAGE ARRAY IMPLEMENTATION

(71) Applicant: EXTEN Technologies, Inc., Austin, TX (US)

(72) Inventors: Michael Enz, Fargo, ND (US); Ashwin Kamath, Cedar Park, TX (US)

(73) Assignee: EXTEN TECHNOLOGIES, INC., Austin, TX (US)

( * ) Notice: Subject to any disclaimer, the term of this patent is extended or adjusted under 35 U.S.C. 154(b) by 235 days.

(21) Appl. No.: 15/600,405

(22) Filed: May 19, 2017

(65) Prior Publication Data
US 2018/0335957 A1    Nov. 22, 2018

(51) Int. Cl.
*G06F 3/06*    (2006.01)

(52) U.S. Cl.
CPC .......... *G06F 3/0613* (2013.01); *G06F 3/0659* (2013.01); *G06F 3/0679* (2013.01); *G06F 3/0688* (2013.01)

(58) Field of Classification Search
None
See application file for complete search history.

(56) References Cited

U.S. PATENT DOCUMENTS

| | | | |
|---|---|---|---|
| 2010/0332755 A1* | 12/2010 | Bu | G06F 9/52 711/119 |
| 2011/0238926 A1* | 9/2011 | Fryman | G06F 12/0817 711/141 |
| 2013/0254467 A1* | 9/2013 | Parizi | G06F 3/0688 711/103 |
| 2014/0379999 A1* | 12/2014 | Pelissier | G06F 9/546 711/147 |
| 2015/0254003 A1* | 9/2015 | Lee | G06F 13/382 711/103 |
| 2015/0370665 A1* | 12/2015 | Cannata | H04L 49/356 714/4.11 |
| 2018/0205603 A1* | 7/2018 | Condict | H04L 41/0806 |

* cited by examiner

*Primary Examiner* — Tracy C. Chan
(74) *Attorney, Agent, or Firm* — Sprinkle IP Law Group

(57) ABSTRACT

Systems and methods (including hardware and software) are disclosed for us in a multi-core, multi-socket server with many RDMA network adapters and NVME solid state drives. One of the features of the subject matter is to optimize the total IO throughput of the system by first replacing software locks with non-interruptible event handlers running on specific CPU cores that own individual software data structures and hardware queues, and second by moving work to that CPU affinity without stalling due to software lock overhead.

16 Claims, 3 Drawing Sheets

LOCK-FREE DATAPATH DESIGN FOR EFFICIENT PARALLEL PROCESSING STORAGE ARRAY IMPLEMENTATION

TECHNICAL FIELD

The subject disclosure relates generally to computer software and hardware design. In particular, the subject disclosure relates to lock-free datapath design for efficient parallel processing storage array implementation.

BACKGROUND

Traditional storage and networking software does not account for modern parallel hardware interfaces present in non-volatile memory express (NVME) storage devices and remote direct memory access (RDMA) network adapters. These interfaces must operate independently for maximum performance.

The performance goals of storage software have increased by several orders of magnitude with the arrival of solid state drives. This requires a revamp of traditional software design to eliminate bottlenecks from lock acquisition and contention.

Modern computer design provides numerous parallel processing cores and central processing units (CPU) sockets, each with dedicated memory controllers and PCI Express (PCIe) interfaces. These hardware configurations must be considered for efficient software design, allowing a storage subsystem to move work to the most efficient physical interface without locking.

The entire high speed datapath must allow management operations for configuration and tuning without slowing down the storage and networking traffic.

Although there exists a storage performance development kit (SPDK) which has developed user mode, polling drivers to eliminate kernel transitions, data copies, and interrupt latencies, this is merely an initial step in supporting high performance storage and networking traffic.

SUMMARY OF THE SUBJECT DISCLOSURE

The present subject disclosure defines how to use lock-free storage software to optimize modern storage hardware and networking hardware on parallel processing computers.

The present subject disclosure provides a lock free software design, to allow parallel management operations with the datapath and to efficiently move work to the ideal hardware interface.

In one exemplary embodiment, the present subject matter is a method for optimizing Input/Output (IO) throughput. The method includes receiving at a first core a client IO request from a network; translating a user volume address to a drive address; and transferring the request to a second core that owns the drive address.

In another exemplary embodiment, the present subject matter is a storage appliance. The storage appliance includes a plurality of central processing unit (CPU) sockets, each socket including a plurality of cores; wherein each core operates independently without locks.

In yet another exemplary embodiment, the present subject matter is a storage appliance. The storage appliance includes a plurality of central processing unit (CPU) sockets, each socket including a plurality of cores and a management core, wherein the management core provides updated broadcast to all other cores in the plurality of cores; wherein each core operates independently without locks; wherein when acted upon by a processor, is adapted for performing the following steps: receiving at a first core a client IO request from a network; translating a user volume address to a drive address; and transferring the request to a second core that owns the drive address.

BRIEF DESCRIPTION OF THE DRAWINGS

Various exemplary embodiments of this disclosure will be described in detail, wherein like reference numerals refer to identical or similar components or steps, with reference to the following figures, wherein.

DETAILED DESCRIPTION

The scalable software design according to the present subject matter works best in a multi-core, multi-socket server with many RDMA network adapters and NVME solid state drives. One of the features of the subject matter is to optimize the total IO throughput of the system by first selecting the ideal hardware affinity for processing work, and second by moving work to that CPU affinity without stalling due to software lock overhead.

The present subject disclosure discloses a technique wherein each CPU core runs a single user mode thread that schedules and executes single event handlers (that run once) or repeated event handlers (that poll at a regular interval). The event handlers run to completion without interruption. By scheduling non-interruptible event handlers on specific CPU cores, there is no need for traditional mutex/semaphore software locks or atomic variable usage. Data structures accessed by the event handlers do not require software locks since no other threads or processes may access them. In this model, operations are asynchronous, where the CPU never waits for an input/output (IO) completion, which allows efficient scheduling of very small quantas of work. Replacing locks with tiny, scheduled event handlers provides an extremely efficient datapath.

The software design according to the present subject disclosure may apply similarly to a tiny-CPU core design with up to thousands of cores in a systolic array, or a multiple computer (cluster) design.

Figure 1:
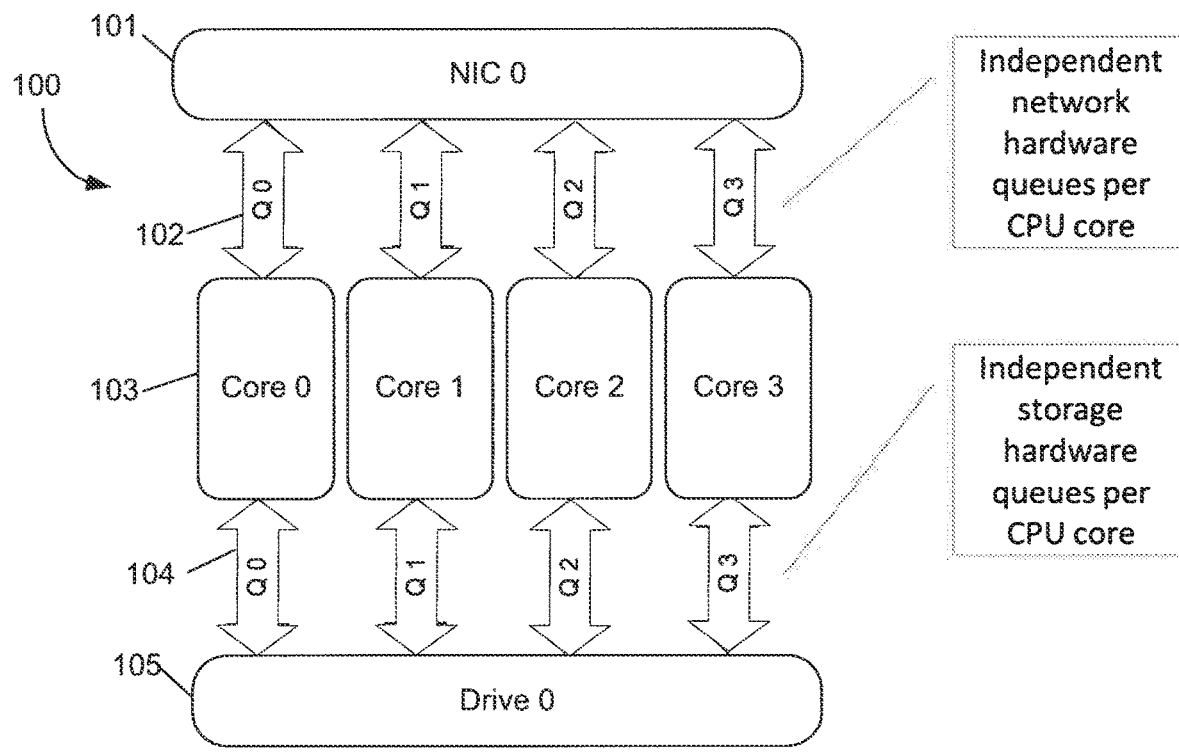
FIG. 1 illustrates a modern network and storage hardware having multiple interfaces, according to an exemplary embodiment of the present subject disclosure.

As shown in the exemplary embodiment of FIG. 1, the subject disclosure may be lock free datapath 100. This figure illustrates a conventional network and storage hardware that have multiple interfaces, allowing lock free access per CPU core 103. Each core 103 runs a separate, single, lock-free thread. For example, Core 0 103 runs a queue 102 between itself and the network interface card 101 (NIC 0). Core 0 103 also runs a queue 104 between itself and Drive 0 105. The series of queues 102 between the NIC 0 101 and Core 0, Core 1, Core 2, and Core 3 illustrate independent network hardware queues per CPU core. Similarly, the queues 104 between Core 0, Core 1, Core 2, and Core 3 and Drive 0 105 illustrate independent storage hardware queues per CPU core. Each Drive 0 has multiple interfaces. In conventional systems, all cores, namely, Core 0, Core 1, Core 2, and Core 3 all lock.

Using the present subject matter, it is advantageous to produce inter-processor messages, or, in other words, move work between CPU cores 103. The act of moving work to a dedicated CPU core is another technique to eliminate traditional software locks. Traditional software models will lock a data structure that may be accessed by any core. In contrast, this subject matter schedules an event handler on the specific CPU core owning the data structure.

Figure 2:
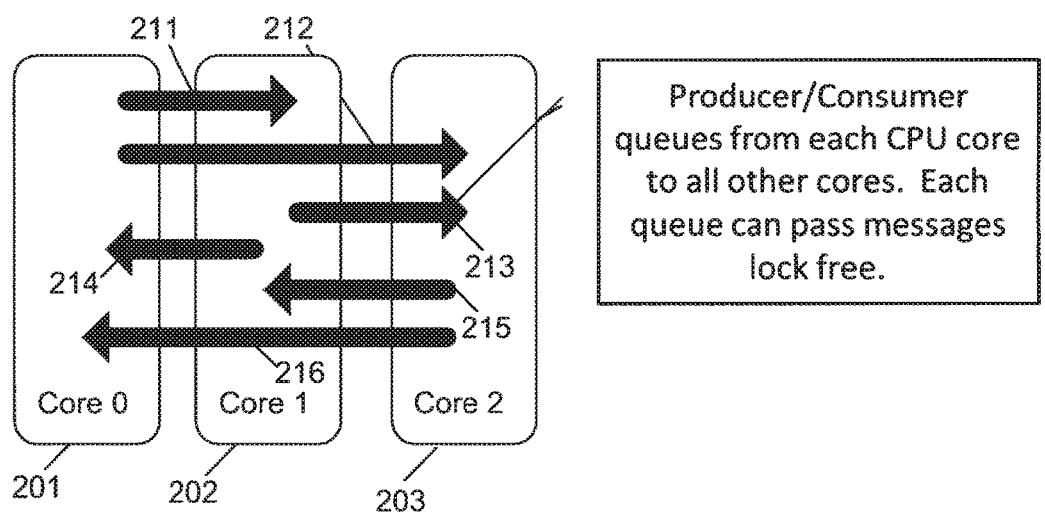
FIG. 2 illustrates efficient message passing with producer-consumer queues, according to an exemplary embodiment of the present subject disclosure.

In a shared memory embodiment of this technique, inter processor messages are communicated with non-blocking consumer-producer queues, where a unique queue exists from each source to every possible destination. FIG. 2. Illustrates such inter-processor message passing using lock-free queues.

FIG. 2 illustrates that efficient message passing is instrumental to implementing this technique. Message passing may be accomplished in many ways. However, dedicated producer-consumer queues for every pair of CPU cores provide a lock free message passing approach. In the example shown, Core 0 201 has a queue 211 to Core 1 202 and queue 212 to Core 2 203. Core 1 202 has a queue 213 to Core 2 203 and queue 214 to Core 0 201. Core 2 203 has a queue 215 to Core 1 202 and queue 216 to Core 0 201. These producer/consumer queues from each CPU core to all other cores show that each queue can pass messages lock free.

Figure 3:
FIG. 3 illustrates an example producer/consumer queue showing fixed size array of entries with producer/consumer indices, according to an exemplary embodiment of the present subject disclosure.

There are a number of ways that the producer-consumer communication may be implemented. In one exemplary embodiment, as shown in FIG. 3, a producer/consumer queue is illustrated showing fixed size array of entries with producer/consumer indices. Both the producer and consumer CPU cores may access the memory that stores the queue and the corresponding index integer variables. The producer writes a value in the queue and increments a producer index. The consumer reads a value from the queue and increments a consumer index. Since the two cores are modifying separate indices, no locking is required. In the example, the source CPU writes messages A, B, and C into the queue in that order. The producer index will have a value 3 and the consumer index will have a value 0. The difference (3−0) equals the number of pending messages in the queue. A message may be any size block of data, but is typically a small descriptor (e.g. 64 bytes) for each IO request. The message may include a memory address for locating additional information in a shared memory.

Each producer/consumer queue is a fixed size. To handle overflow, the source links additional messages on a dedicated source queue. The source CPU then polls the overflow and eventually moves the work to the producer/consumer queue. This model makes the queues appear unlimited in size to the consumers. The destinations then poll queues for available work.

In other embodiments of the subject matter, the queuing model may be implemented in hardware with message passing. This is suitable for a systolic array of processors, or a distributed system of processors that do not share memory access.

Adaptive polling frequency may be used to balance the polling overhead versus message latency. An adaptive polling algorithm attempts to poll more frequently when work is expected, and less frequently when the queue is idle. By reducing the polling frequency for a queue, the CPU core may be used for other work. A simple adaptive polling algorithm may be as follows: Start polling the queue for pending work with a minimum time interval=T0, where T0 is a constant time value. If no work exists, increase interval by a constant T (i.e., interval=interval+T). If work does exist, reset the interval to the minimum (i.e., interval=T0). This is just an example algorithm for optimizing polling for producer/consumer queues, and many others are also possible and within the scope of the present subject disclosure. The model allows extremely low latency work transfer between cores.

Figure 4:
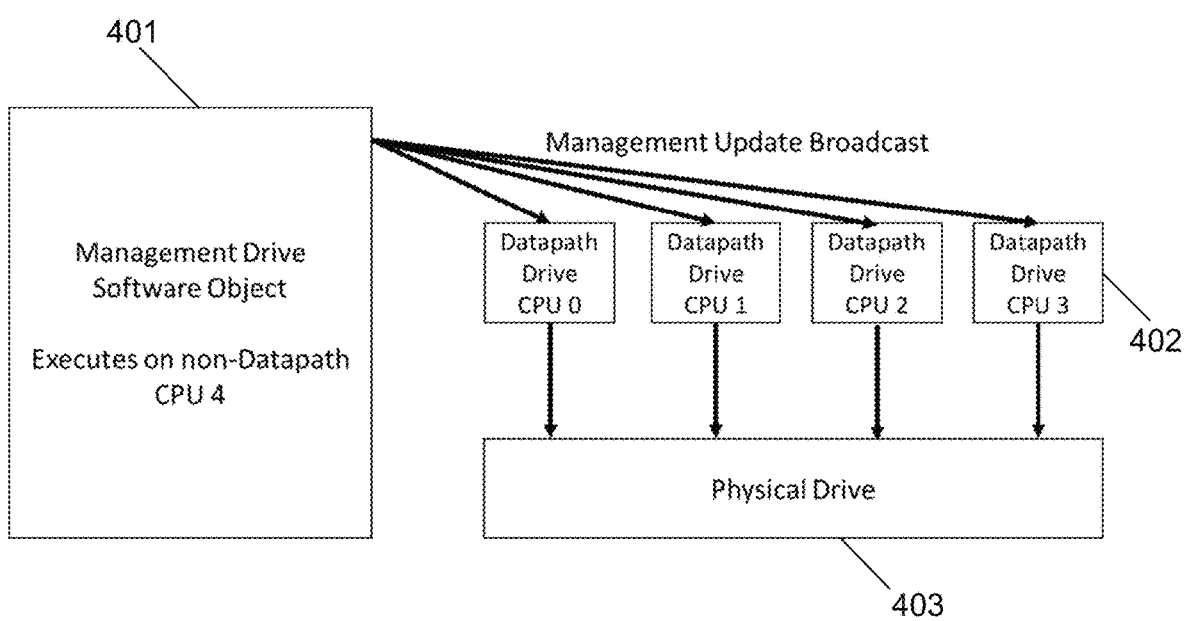
FIG. 4 illustrates a diagram illustrating how a single drive object is decomposed into a "slow" management object and "fast" datapath objects on separate CPUs, according to an exemplary embodiment of the present subject disclosure.

FIG. 4 shows an example of management operations by illustrating how a single drive object is decomposed into "slow" management objects and "fast" datapath objects on separate CPUs. The fast datapath objects maintain independent copies of data structures in memory that reflect the state of the object. Objects that are typically represented as singletons, such as a drive 403, are expanded to have one management interface 401 but a separate datapath interface on each supported datapath CPU core 402. Management updates 401 that configure the object 403 are broadcast to all CPU cores 402 by scheduling single event handlers on cores 402. The handlers run a piece of code (or function) a single time on the target CPU to update that core's data structures. Since each core maintains a dedicated copy of the data structure, it may be read and written without locks both during the management updates and datapath operations. In this manner, the distributed state of object 403 may be carefully updated on each CPU without sacrificing datapath efficiency. The management object 401 is not involved with IO requests, i.e., the high speed datapath. All management operations are driven from threads or processes on separate CPU cores than the datapath. In this non-limiting example, CPU 4 401 is the home of the management drive software object and is not involved with datapath operations. In this manner, IO is not affected by management operations.

Figure 5A:
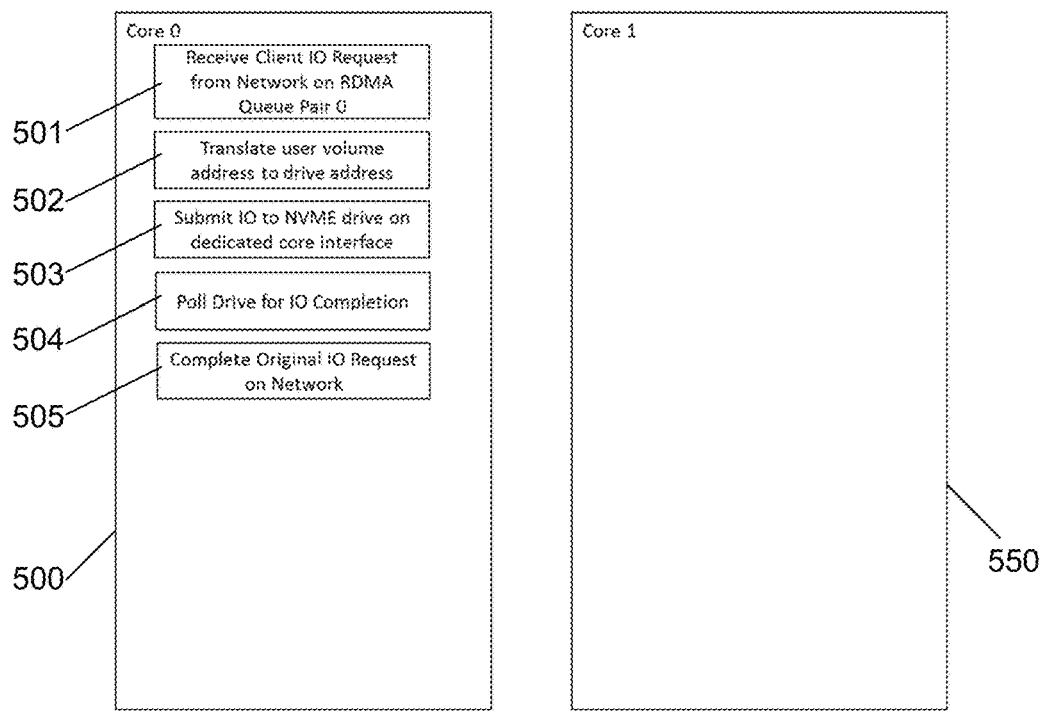
FIG. 5A illustrates scheduling where the network and storage Input/Output (IO) are bound to a single CPU core, according to an exemplary embodiment of the present subject disclosure.

The IO scheduling between conventional techniques and the present subject matter differ in various ways. FIG. 5A illustrates a simple a lock free scheduling path from the network to the storage device that is bound to a single CPU core. In a traditional model, the datapath would need to acquire locks to synchronize for various reasons, such as serializing management changes, network connection errors, or surprise device removal. In the lock free model, the CPU thread maintains state for the system in dedicated per-CPU data structures. The IO path may efficiently check those data structures and proceed with the IO without locks. Management or error path updates would be scheduled as separate event handlers on that same CPU core to update the core's data structures.

Isolating data structures and work to specific CPU cores offers several advantages. The network and storage IO is scheduled with regard to optimal CPU core. The memory buffer that stores the IO request is allocated from a local non-uniform memory access (NUMA) node (memory controller) for fast access to memory transfers. The RDMA connection that requested the IO is processed on the same CPU core as the NVME queue for issuing the storage IO request. Polling for NVME and RDMA completions occur on the same core that issued the IO request. These advantages provide an efficient and highly scalable solution.

As shown specifically in FIG. 5A, various steps are involved in the process involving two cores, namely Core 0 500 and Core 1 550. No interaction occurs between the two cores during this process. At step 501, Core 0 500 receives a client IO from the network on RDMA queue pair 0. The next step 502 is to translate the user volume address to drive address. Next, at step 503, the IO is submitted to NVME devices on dedicated core interface. Step 504 is to poll drive for IO completion. The final step 505 is to complete the original IO request on the network. Core 1 550 is not involved at all in this conventional process.

Figure 5B:
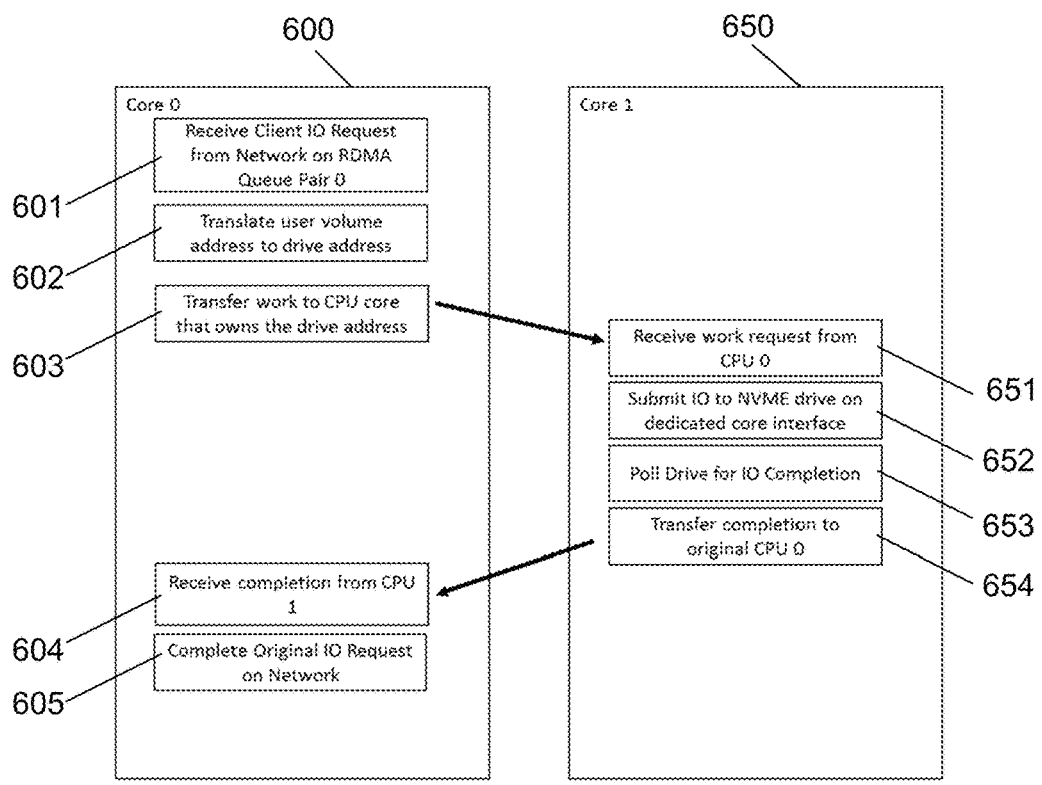
FIG. 5B illustrates scheduling using inter-processor messaging to transfer an IO request between cores, according to an exemplary embodiment of the present subject disclosure.

FIG. 5B is an exemplary embodiment of scheduling using inter-processor messaging to transfer an IO request between cores 600/650. This may be required due to limited drive interfaces as compared to server CPU count, or for additional synchronization for advanced IO features such as caching or RAID. The basic IO scheduling process relies on separate hardware interfaces that are owned by each CPU core. In NVME these are submission queues. If drives have limited submission queues—or if a storage appliance has a large number of CPU cores—a drive may use only a subset of the cores for IO. This requires inter-processor messages to transfer work to the selected cores for the drive. In this particular example, steps 601 and 602 on Core 0 600 are exactly the same as steps 501 and 502 on Core 0 500. At step 603, the processes differ as the work is transferred to the CPU core that owns the drive address, namely Core 1 650. At step 651, Core 1 650 receives the work request from Core 0 600. At step 652, the IO is submitted to NVME drive on dedicated core interface. Step 653 is to poll drive for IO completion. Step 654 then transfers completion to original Core 0 600. At step 604, Core 0 600 receives the completion from Core 1 650. At step 605, the original IO request is completed on the network.

The examples and methods described above are not limited to software or hardware, but may be either or a combination of both. If software, the method described is presented as code in a software program. If hardware, a processor is used to conduct the steps which are embedded within the hardware. The subject matter may also be a combination of software and hardware with one or more steps being embedded within a hardware component, and the other steps being part of a software program.

The illustrations and examples provided herein are for explanatory purposes and are not intended to limit the scope of the appended claims. It will be recognized by those skilled in the art that changes or modifications may be made to the above described embodiment without departing from the broad inventive concepts of the subject disclosure. It is understood therefore that the subject disclosure is not limited to the particular embodiment which is described, but is intended to cover all modifications and changes within the scope and spirit of the subject disclosure.

What is claimed is:

1. A method for optimizing Input/Output (IO) throughput, comprising:
receiving at a first core a client IO request from a network, wherein the first core is one of a plurality of cores of a CPU socket, each of the plurality of cores having a dedicated core interface to a drive and a dedicated core interface to the network and wherein there is a unique producer-consumer queue between each of the plurality of cores of the CPU socket, each queue having a fixed sized array of entries with a producer index and a consumer index such that the difference between the producer index and the consumer index equals a number of available entries in the queue between the respective cores associated with that queue;
translating, at the first core, a user volume address associated with the client IO request to a drive address of the drive to determine a second core of the plurality of cores of the CPU socket that owns the drive address;
determining if there is room in the producer-consumer queue between the first core and the second core based on the producer index and the consumer index associated with the producer-consumer queue between the first core and the second core;
if there is not room in the in the producer-consumer queue between the first core and the second core, placing the client request on an overflow queue dedicated to the producer-consumer queue between the first core and the second core and polling the producer index and the consumer index associated with the producer-consumer queue between the first core and the second core to determine that there is room in the producer-consumer queue between the first core and the second core;
transferring the client IO request to the second core of the plurality of cores of the CPU socket, wherein and the client IO request is transferred through the producer-consumer queue between the first core and the second core without performing a lock such that the second core of the plurality of cores of the CPU socket can receive the client IO request through the producer-consumer queue between the first core and the second core without performing the lock and perform the client IO request associated with the drive address through the second core's dedicated core interface with the drive without performing the lock associated with the drive address, wherein when the client IO request is placed in the producer-consumer queue between the first core and the second core by the first core the producer index is incremented by the first core, and when the second core reads the client IO request the second core increments the consumer index associated with the producer-consumer queue between the first core and the second core.

2. The method of claim 1, wherein the drive is a non-volatile memory express (NVME) drive and the method further comprises submitting the client IO request to the non-volatile memory express (NVME) drive on the dedicated core interface.

3. The method of claim 2, further comprising polling the NVME drive for IO completion.

4. The method of claim 3, further comprising transferring the IO completion to the first core.

5. The method of claim 4, further comprising receiving at the first core the IO completion from the second core.

6. The method of claim 5, further comprising completing the client IO request on the network.

7. The method of claim 1, further comprising a plurality of cores, including a management core which is not involved in IO datapath.

8. The method of claim 7, wherein the management core provides updated broadcast to all other cores in the plurality of cores.

9. A storage appliance, comprising:
a plurality of central processing unit (CPU) sockets, each socket including a plurality of cores, each of the plurality of cores having a dedicated core interface to a drive and a dedicated core interface to the network and wherein there is a unique producer-consumer queue between each of the plurality of cores, wherein each core operates independently without locks and each queue has a fixed sized array of entries with a producer index and a consumer index such that the difference between the producer index and the consumer index equals a number of available entries in the queue between the respective cores associated with that queue, and wherein a first core of the plurality of cores of a CPU of the plurality of CPU sockets is adapted to:

receive a client IO request from a network;

translate a user volume address the associated with the client IO request to a drive address of the drive to determine a second core of the plurality of cores of the CPU socket that owns the drive address;

determine if there is room in the producer-consumer queue between the first core and the second core based on the producer index and the consumer index associated with the producer-consumer queue between the first core and the second core;

if there is not room in the in the producer-consumer queue between the first core and the second core, placing the client request on an overflow queue dedicated to the producer-consumer queue between the first core and the second core and polling the producer index and the consumer index associated with the producer-consumer queue between the first core and the second core to determine that there is room in the producer-consumer queue between the first core and the second core, and transfer the client IO request to the second core of the CPU of the plurality of CPU sockets through the producer-consumer queue between the first core and the second core of the CPU without performing a lock, wherein when the client IO request is placed in the producer-consumer queue between the first core and the second core by the first core the producer index is incremented by the first core, and the second core of the plurality of cores is adapted to:

receive the client IO request through the producer-consumer queue between the first core and the second core of the CPU without performing a software lock and perform the client IO request associated with the drive address through the second core's dedicated core interface with the drive without performing the lock associated with the drive address, wherein when the second core reads the client IO request the second core increments the consumer index associated with the producer-consumer queue between the first core and the second core.

10. The storage appliance of claim 9, wherein the drive is a non-volatile memory express (NVME) drive and the client IO request is submitted to the non-volatile memory express (NVME) drive on the dedicated core interface.

11. The storage appliance of claim 10, further comprising polling the NVME drive for IO completion.

12. The storage appliance of claim 11, further comprising transferring the IO completion to the first core.

13. The storage appliance of claim 12, further comprising receiving at the first core the IO completion from the second core.

14. The storage appliance of claim 13, further comprising completing the client IO request on the network.

15. The storage appliance of claim 9, further comprising a management core which is not involved in IO datapath.

16. The storage appliance of claim 15, wherein the management core provides updated broadcast to all other cores in the plurality of cores.

\* \* \* \* \*

UNITED STATES PATENT AND TRADEMARK OFFICE
CERTIFICATE OF CORRECTION

PATENT NO. : 10,776,012 B2
APPLICATION NO. : 15/600405
DATED : September 15, 2020
INVENTOR(S) : Michael Enz et al.

Page 1 of 1

It is certified that error appears in the above-identified patent and that said Letters Patent is hereby corrected as shown below:

In the Claims

Column 6, Claim 1, Line 13 should read --if there is not room in the producer-consumer queue--

Column 6, Claim 1, Line 23 should read --plurality of cores of the CPU socket, wherein the--

Column 7, Claim 9, Line 11 should read --translate a user volume address associated with the--

Column 7, Claim 9, Line 20 should read --if there is not room in the producer-consumer--

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*